United States Patent
Chhabra et al.

(10) Patent No.: US 9,807,653 B2
(45) Date of Patent: Oct. 31, 2017

(54) DEVICE AND METHOD FOR BASIC SERVICE SET TRANSITION MANAGEMENT

(71) Applicant: APPLE INC., Cupertino, CA (US)

(72) Inventors: Kapil Chhabra, Cupertino, CA (US); Veerendra Boodannavar, Cupertino, CA (US)

(73) Assignee: APPLE INC., Cupertino, CA (US)

(*) Notice: Subject to any disclaimer, the term of this patent is extended or adjusted under 35 U.S.C. 154(b) by 233 days.

(21) Appl. No.: 14/292,052

(22) Filed: May 30, 2014

(65) Prior Publication Data

US 2015/0350875 A1    Dec. 3, 2015

(51) Int. Cl.
 *H04W 36/00* (2009.01)
 *H04W 36/22* (2009.01)
 *H04W 36/08* (2009.01)

(52) U.S. Cl.
 CPC .... *H04W 36/0083* (2013.01); *H04W 36/0061* (2013.01); *H04W 36/08* (2013.01); *H04W 36/22* (2013.01)

(58) Field of Classification Search
 CPC . H04W 36/0083; H04W 36/22; H04W 36/08; H04W 36/0061
 See application file for complete search history.

(56) References Cited

U.S. PATENT DOCUMENTS

| | | | | |
|---|---|---|---|---|
| 2006/0099952 | A1* | 5/2006 | Prehofer | H04W 36/24 455/440 |
| 2007/0019647 | A1* | 1/2007 | Roy | H04L 45/12 370/392 |
| 2008/0102852 | A1* | 5/2008 | Du | H04W 48/20 455/453 |
| 2010/0322094 | A1* | 12/2010 | Allpress | H04W 72/02 370/252 |
| 2011/0130149 | A1* | 6/2011 | Yao | H04W 48/12 455/453 |
| 2015/0173014 | A1* | 6/2015 | Lee | H04W 52/0216 370/311 |

* cited by examiner

*Primary Examiner* — Marcos Torres
(74) *Attorney, Agent, or Firm* — Fay Kaplun & Marcin, LLP (57) ABSTRACT

A method, station and computer readable storage medium used to perform a roaming procedure. The method performed by the station including determining whether a roam is to be performed, the station being associated with a first access point (AP), receiving network related information for at least one second AP, determining a score value for each of the at least one second AP based upon the network related information, the score value being either a quantitative score calculated as a function of a respective received signal strength indicator (RSSI) value and a respective load value or a qualitative score calculated as a function of a preference value and the RSSI value, selecting one of the at least one second AP based upon the score values and roaming from the first AP to the selected one of the at least one second AP.

18 Claims, 7 Drawing Sheets

Preference Rating
Scoring Table
700

| Preference Rating | Low | High |
|---|---|---|
| Best | 201 | 255 |
| Good | 101 | 200 |
| Average | 51 | 100 |
| Poor | 11 | 50 |
| Bad | 1 | 10 |
| Omit | 0 | 0 |

Fig. 7A

RSSI Rating
Scoring Table
750

| RSSI Rating | High | Low |
|---|---|---|
| Best | -10dB | -39dB |
| Good | -40dB | -49dB |
| Average | -50dB | -59dB |
| Poor | -60dB | -64dB |
| Bad | -65dB | -70dB |

Fig. 7B

DEVICE AND METHOD FOR BASIC SERVICE SET TRANSITION MANAGEMENT

BACKGROUND INFORMATION

A station may be configured to communicate wirelessly by establishing a connection with a network via an access point (AP). The station may associate with the network through the AP using association procedures. The station may include a connection application that is executed to perform this functionality of associating with the network. When more than one network and/or more than one AP is available for association, the station may connect to any one of these APs using a variety of criteria. In a particular example relating to a load criteria, attempts to connect to an AP that is fully or almost fully loaded may result in blacklisting the network since the AP denies all association attempts, thereby eliminating further attempts by the station to connect to the network. In an attempt to steer these stations to better networks, the AP may send de-authentication information to the station assuming the connection application will connect to a different network via other APs.

The Institute of Electrical and Electronics Engineers (IEEE) has provided a standard set under 802.11 that determine a manner in which a station is capable of associating with a network via the AP. Specifically, 802.11v provides a mechanism where an AP steers the station to intended networks based on load, available bandwidth, and other network characteristics. However, this mechanism has the potential to make the AP steer the station to different networks frequently. When associating with a network, a basic service set (BSS) of the associated AP is used. With the frequent changes in association from the steering mechanism, frequency BSS transitions also result. This may lead to using additional power, disrupting any user activity like browsing, etc.

DETAILED DESCRIPTION

The exemplary embodiments describe a method performed by a station that includes determining whether a roam is to be performed, the station being associated with a first access point (AP) corresponding to a first network, receiving network related information for at least one second AP within a communication range of the station, determining a score value for each of the at least one second AP corresponding to a respective second network based upon the respective network related information, the score value being one of a quantitative score and a qualitative score, the quantitative score being calculated for each of the at least one second AP as a function of a respective received signal strength indicator (RSSI) value and a respective load value, the qualitative score being calculated for each of the at least one second AP as a function of a preference value and the RSSI value, selecting one of the at least one second AP based upon the score values and roaming from the first AP to the selected one of the at least one second AP.

The exemplary embodiments also describe a station that is associated with a first access point (AP) corresponding to a first network. The station includes a transceiver configured to establish a connection with the first AP and a processor. The processor and transceiver are configured to perform a roam handover from the first AP to one of at least one second AP corresponding to a respective second network by determining whether a roam is to be performed, receiving network related information for the at least one second AP within a communication range of the station, determining a score value for each of the at least one second AP based upon the respective network related information, the score value being one of a quantitative score and a qualitative score, selecting one of the at least one second AP based upon the score values and roaming from the first AP to the selected one of the at least one second AP.

The exemplary embodiments further describe a non-transitory computer readable storage medium with an executable program stored thereon. The program instructs a microprocessor to perform operations including determining whether a roam is to be performed, the station being associated with a first access point (AP) corresponding to a first network, receiving network related information for at least one second AP within a communication range of the station, determining a score value for each of the at least one second AP corresponding to a respective second network based upon the respective network related information, the score value being one of a quantitative score and a qualitative score, the quantitative score being calculated for each of the at least one second AP as a function of a respective received signal strength indicator (RSSI) value and a respective load value, the qualitative score being calculated for each of the at least one second AP as a function of a preference value and the RSSI value, selecting one of the at least one second AP based upon the score values and roaming from the first AP to the selected one of the at least one second AP.

The exemplary embodiments may be further understood with reference to the following description and the related appended drawings, wherein like elements are provided with the same reference numerals. The exemplary embodiments are related to a device and method for a basic service set (BSS) transition management. Specifically, a station may associate with a network via an access point (AP) to join the BSS in which the network architecture includes a steering mechanism. The station may select the AP for association based upon a calculated score, which indicates an optimal AP among a plurality of APs that are available for association. The calculated score may be a quantitative score or a qualitative score, which utilizes network characteristics corresponding to each AP.

Figure 1:
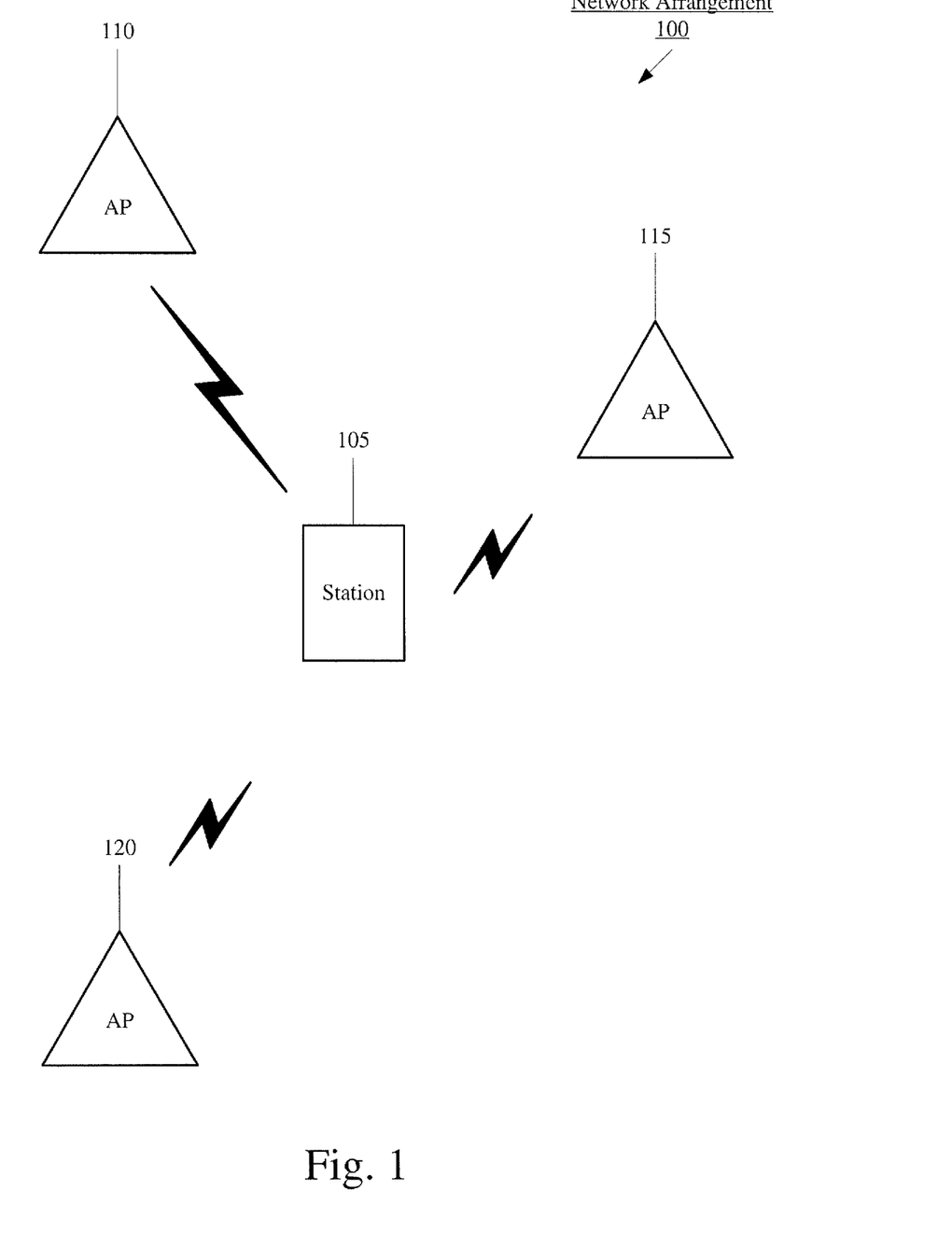
FIG. 1 shows an exemplary network arrangement in which a station associates with an access point.

FIG. 1 shows an exemplary network arrangement 100 in which a station 105 associates with an AP. The station 105 may be configured to communicate with a plurality of APs such as AP 110, AP 115, and AP 120. However, it should be noted that the network arrangement 100 may have any number of APs with which the station 105 may communicate therewith. For example, the network arrangement 100 may only have a single AP. In another example, the network arrangement 100 may have more than three APs with which the station 105 is capable of communicating. In this example, it may be considered that the station 105 is disposed in the operating area that is covered by each of the APs 110-120. Since the station 105 is capable of communicating with the APs 110-120, the station 105 may receive network related information from each of the APs 110-120. By receiving the network related information, the station 105 may select an AP with which to associate (if not currently joined to a network) or roam (if currently joined to a network). For example, the station 105 may perform an association process to associate with the AP 110.

The APs 110-120 may each store network related information. For example, each of the APs 110-120 may include a database or be connected to a storage unit (not shown) that stores the network related information. The network related information may be for any type of data such as Quality of Service (QoS) BSS (QBSS) information that may include load information on the APs 110-120. As will be described in further detail below, particularly when the APs 110-120 include the steering functionality, the QBSS information may be provided to a station attempting to associate with the APs 110-120. The network related information may be used as a basis by the station 105 as suggestions and/or recommendations to an AP with which the station may associate. For example, when an unsolicited BSS transition management request is generated by the AP, this request may be abridged such that the suggestions may be included.

The APs 110-120 may each correspond to a different network. That is, the AP 110 corresponds to a first network, the AP 115 corresponds to a second network, and the AP 120 corresponds to a third network. Therefore, a station associated with the AP 110 may be joined to the first network, a station associated with the AP 115 may be joined to the second network, and a station associated with the AP 120 may be joined to the third network. Each of the APs 110-120 corresponding to different networks may be connected to a respective central server of the network. Although part of different networks, the APs 110-120 may still be configured to communicate with one another such that network related information may be accessed by each AP 110-120. For example, the APs 110-120 may have connected to an overall, combined network or the networks for the APs 110-120 are configured to communicate with each other such that the network related information may be shared between the APs 110-120 and the networks.

The station 105 may be configured to associate with any of the APs 110-120. For example, the station 105 may associate with the AP 110 to join the network corresponding to the AP 110. To associate with an AP, the station 105 may include a transition application that is executed to perform this functionality. Specifically, the transition application may be used in a pre-association state of the MU 105 in which no network has been joined or in a roaming state of the MU 105 in which a network has already been joined.

Figure 2:
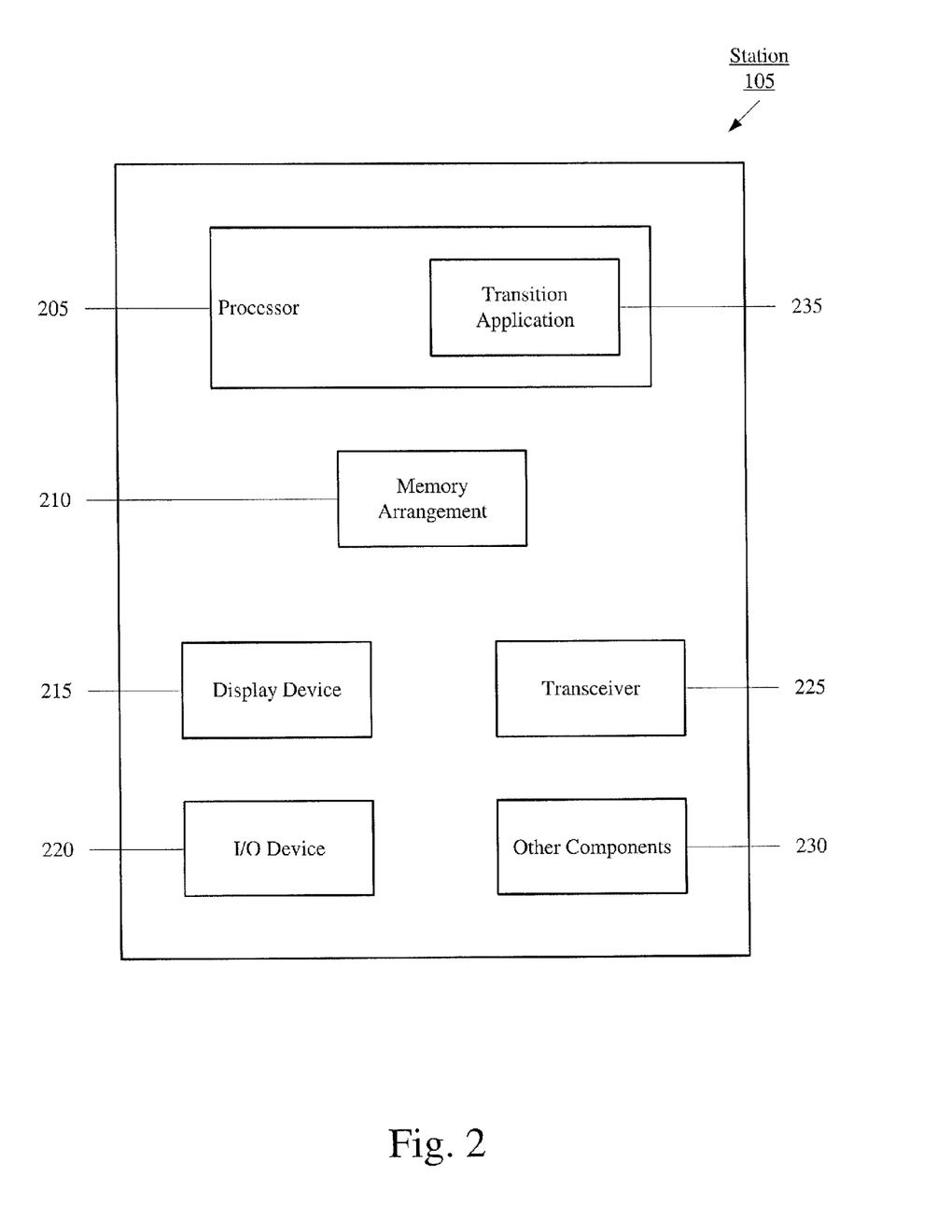
FIG. 2 shows the exemplary station of FIG. 1 configured to use a transition application.

FIG. 2 shows the exemplary station 105 of FIG. 1 configured to use the transition application. The station 105 may be any electronic component configured to join a network via an AP. For example, the station 105 may be a portable device such as a cellular phone, a smartphone, a tablet, a phablet, a laptop, etc. In another example, the station 100 may be a stationary device such as a desktop terminal. The station 105 may include a processor 205, a memory arrangement 210, a display device 215, an input/output (I/O) device 220, a transceiver 225, and other components 230 such as a portable power supply, an audio (I/O) device, etc.

The processor 205 may be configured to execute a plurality of applications of the station 105. The processor may be an applications processor or a processor associated with a WiFi chip of the station 105 that may execute applications stored in firmware, or a combination thereof. According to the exemplary embodiments, the one of the applications may include a transition application 235 that is used to join a network and associate with an AP. Specifically, the association with the AP may occur while the station 105 is not currently joined with any network (e.g., pre-association state) or while the station 105 has already joined a network and is prepared to roam to a different network (e.g., roaming state). It should be noted that the transition application 235 being an application (e.g., a program) executed by the processor 205 is only exemplary. The transition application 235 may also be represented as a separate incorporated component of the station 105 or may be a modular component coupled to the station 105.

The memory arrangement 210 may be a hardware component configured to store data related to operations performed by the station 105. Specifically, the memory arrangement 210 may store the network related information received from the APs 110-120 such as the QBSS information. The display device 215 may be a hardware component configured to show data to a user while I/O device 220 may be a hardware component configured to receive inputs from the user and output corresponding data. The other components 230 may include a portable power supply (e.g., battery) if the station 105 is portable, a data acquisition device, ports to electrically connect the station 105 to other electronic devices, etc.

The transceiver 225 may be a hardware component configured to transmit and/or receive data. That is, the transceiver 225 may enable communication with other electronic devices such as the APs 110-120. Accordingly, the transceiver 225 may be used to receive the network related information from the APs 110-120 and be used in the association process to join a network. The transceiver 225 may operate on a variety of different frequencies or channels (e.g., set of consecutive frequencies) that are related to the APs 110-120.

As discussed above, the station 105 may be in a pre-association state or a roaming state. Depending on the state that the station 105 is in, the transition application 235 may provide a corresponding functionality in order to join a network. As will be described in further detail below, when the station 105 is in the pre-association state, the transition application 235 may receive network related information from all available APs to determine which AP to associate in order to join a network. When the station 105 is in the roaming state, the transition application 235 may operate in different manners. In a first manner, the transition application 235 may perform a solicited BSS transition management functionality that monitors the network related information of the currently associated AP to determine whether a roam is to be performed to a different network such that a more optimal user experience is provided regarding the network connectivity. In a second manner, the transition application 235 may perform an unsolicited BSS transition management functionality in which an unsolicited BSS transition management request is received from the currently associated AP to determine whether a roam is to be performed and, if the roam is to be performed, to utilize information included in the unsolicited BSS transition management request as well as available network related information. The states of the station 105 and manners in which the transition application 235 operates as a function thereof will be described in further detail below.

Figure 3:
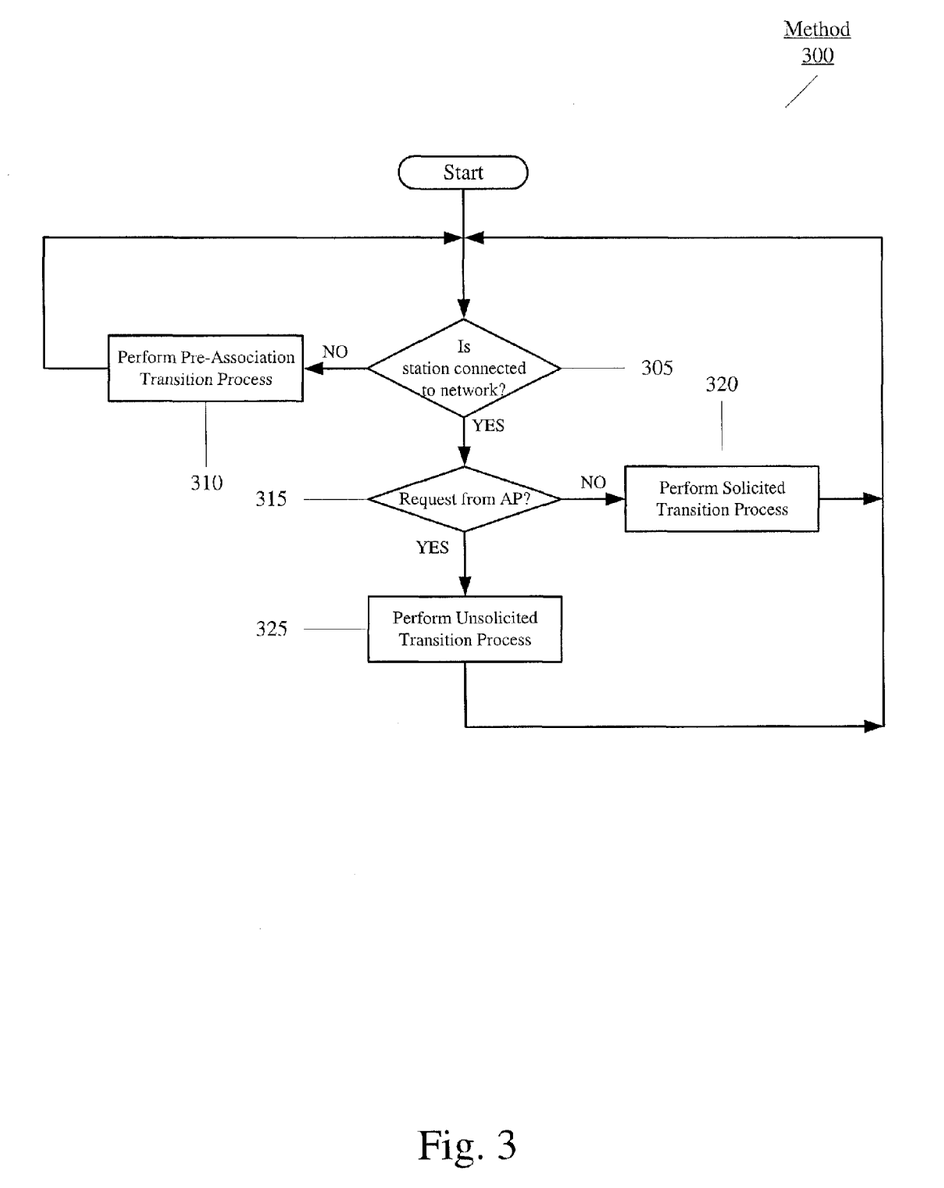
FIG. 3 shows an exemplary method of an overall process of transition management.

FIG. 3 shows an exemplary method 300 of an overall process of transition management performed by the transition application 235. The method 300 relates to performing a particular transition management functionality based upon a set of conditions of the station 105. The method 300 will be described with reference to the network arrangement 100 of FIG. 1 and the station 105 of FIG. 2.

In step 305, the transition application 235 determines whether the station 105 is currently joined to a network and associated with an AP. When the transition application 235 determines that the station 105 is not currently associated with an AP, this may be considered a pre-association state. If the station 105 is in the pre-association state, the method continues to step 310, where the transition application 235 performs the pre-association transition process in order to join a network by associating with an AP. The pre-association BSS transition management functionality of step 315 will be described in further detail below with regard to FIG. 4.

Returning to step 305, if the station 105 is associated with an AP and currently joined to a network, this may be considered to be a roaming state. If the station 105 is in the roaming state, the method 300 continues from step 305 to step 315. In step 315, the transition application 235 determines whether the BSS transition management request is received from the associated AP. For example, if the station 105 is currently connected to the AP 110, the transition application determines whether the BSS transition management request was received from the AP 110.

If the BSS transition management request is not received from the currently associated AP, the method 300 continues to step 320. In step 320, the transition application 235 performs the solicited transition process. That is, the transition application 235 performs the solicited BSS transition management functionality. The solicited BSS transition management functionality of step 325 will be described in further detail below with regard to FIG. 5.

If the BSS transition management request is received from the currently associated AP, the method 300 continues to step 325. In step 325, the transition application 235 performs the unsolicited transition process. That is, the transition application 235 performs the unsolicited BSS transition management functionality. The unsolicited BSS transition management functionality of step 330 will be described in further detail below with regard to FIG. 6.

It should be noted that after steps 310, 320, 325, the method 300 returns to step 305 such that the transition application 325 may continually monitor the manner in which the connectivity to a network is to be utilized.

Figure 4:
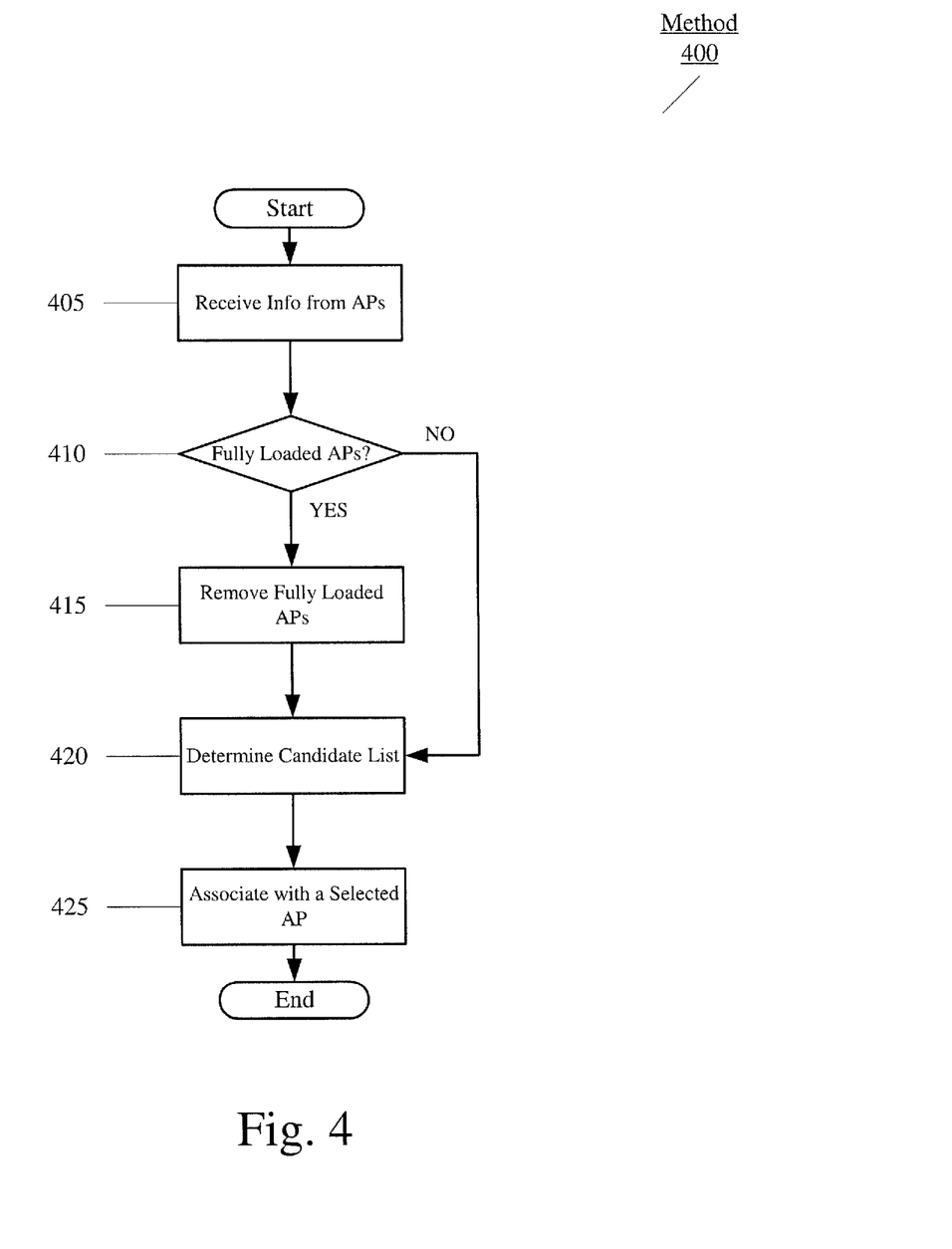
FIG. 4 shows an exemplary method for a pre-association process of the overall process of FIG. 3.

FIG. 4 shows an exemplary method 400 for the pre-association process in step 310 of the overall process 300 of FIG. 3. That is, the method 400 of FIG. 4 relates to the transition application 235 performing the pre-association BSS transition management functionality. Thus, the station 105 may be considered to be in the pre-association state in which the station 105 is not currently joined to a network at the start of the method 400. The method 400 will be described with reference to the network arrangement 100 of FIG. 1 and the station 105 of FIG. 2.

In step 405, the transition application 235 of the station 105 receives network related information for each AP within communication range. In the example of FIG. 1, the transition application 235 receives respective network related information from the APs 110-120. Within the network related information may be QBSS information that indicates a load currently being experienced by the APs 110-120. The network related information may also include other types of information such as available frequencies, channels, etc. In this step 405, it may be considered that at least one AP is available to provide the network related information.

The method 400 continues to step 410. In step 410, based upon the network related information, specifically the QBSS information, the transition application 235 of the station 105 determines whether any of the APs that responded are at capacity or fully loaded. The QBSS information may indicate that the AP is saturated or at 100% capacity and is incapable of accepting any further station for association. It should be noted that using the QBSS information to determine the capacity is only exemplary. Different networks and/or APs may provide capacity information (either directly or indirectly) in other manners. By indirectly, it is meant that the AP provides a network parameter that the station 105 may use to calculate an exact or approximate load on the AP.

When an AP is at capacity, no further station may be allowed to associate therewith. As discussed above, depending on the operating system and the manner in which the station 105 operates to handle this scenario, the denial to associate with the AP may result in blacklisting the network that corresponds to the fully loaded AP. Thus, even after the particular fully loaded AP becomes less loaded and available, the station 105 may ignore this AP because it has been blacklisted. In contrast to this blacklisting of fully loaded APs, the exemplary embodiments operate in a manner that allows the currently fully loaded AP (and the corresponding network) to be an available network at a later time when the AP is less loaded.

Referring back to the method 400, if none of the available APs are fully loaded, the method 400 continues to step 420 that will be described in greater detail below.

However, if at least one available AP is fully loaded, the method 400 continues to step 415. In step 415, the transition application 235 removes the fully loaded available AP from consideration. Since the AP is at capacity, the station 105 is incapable of associating with the AP. For example, in the network arrangement of FIG. 1, the AP 120 may be at 100% capacity such that an association request transmitted from the station 105 to the AP 120 would result in a rejection response. By removing the AP 120 from consideration as an available AP in this step 415, the transition application 235 may still consider the network associated with the AP 120 at a subsequent time when this network may be capable of having the station 105 associate with the AP 120.

In step 420, the transition application 235 determines a candidate list of APs that are available for association. If none of the APs are at capacity (as determined in step 410), the candidate list may comprise all the APs that are determined by a scan of the station 105. For example, the APs 110-120 may all be included in the candidate list. If at least one of the APs are at capacity, the candidate list may comprise only the APs identified in the scan that have network related information in which the QBSS information that indicates that the AP is not at full capacity. For example, the APs 110, 115 may be included in the candidate list while the AP 120 is removed from the candidate list as it is at capacity.

Subsequently, in step 425, the transition application 235 selects one of the APs in the candidate list for association to join the corresponding network. For example, the transition application 235 may utilize a received signal strength indicator (RSSI) value of the AP, an available bandwidth of the AP, etc. to determine which AP from the candidate list should be selected for association. The transition application 235 may calculate quantitative and/or qualitative scores for each AP on the candidate list to select the AP for association. Examples of these calculations will be described in greater detail below.

In the example provided, the AP 120 would be removed from consideration as an available AP in step 415 because it is fully loaded. However, the AP 120 and corresponding network would not be blacklisted because of this removal from the candidate list. Thus, the AP 120 and corresponding network may still be considered in subsequent association processes.

As described above with reference to FIG. 3, when the transition application 235 determines that the station 105 is in the roaming state, the transition application then determines whether the station 105 is to perform a solicited transition process (step 320) or an unsolicited transition process (step 325). The following methods described with reference to FIGS. 5 and 6 will describe this solicited and unsolicited BSS transition management functionality.

Figure 5:
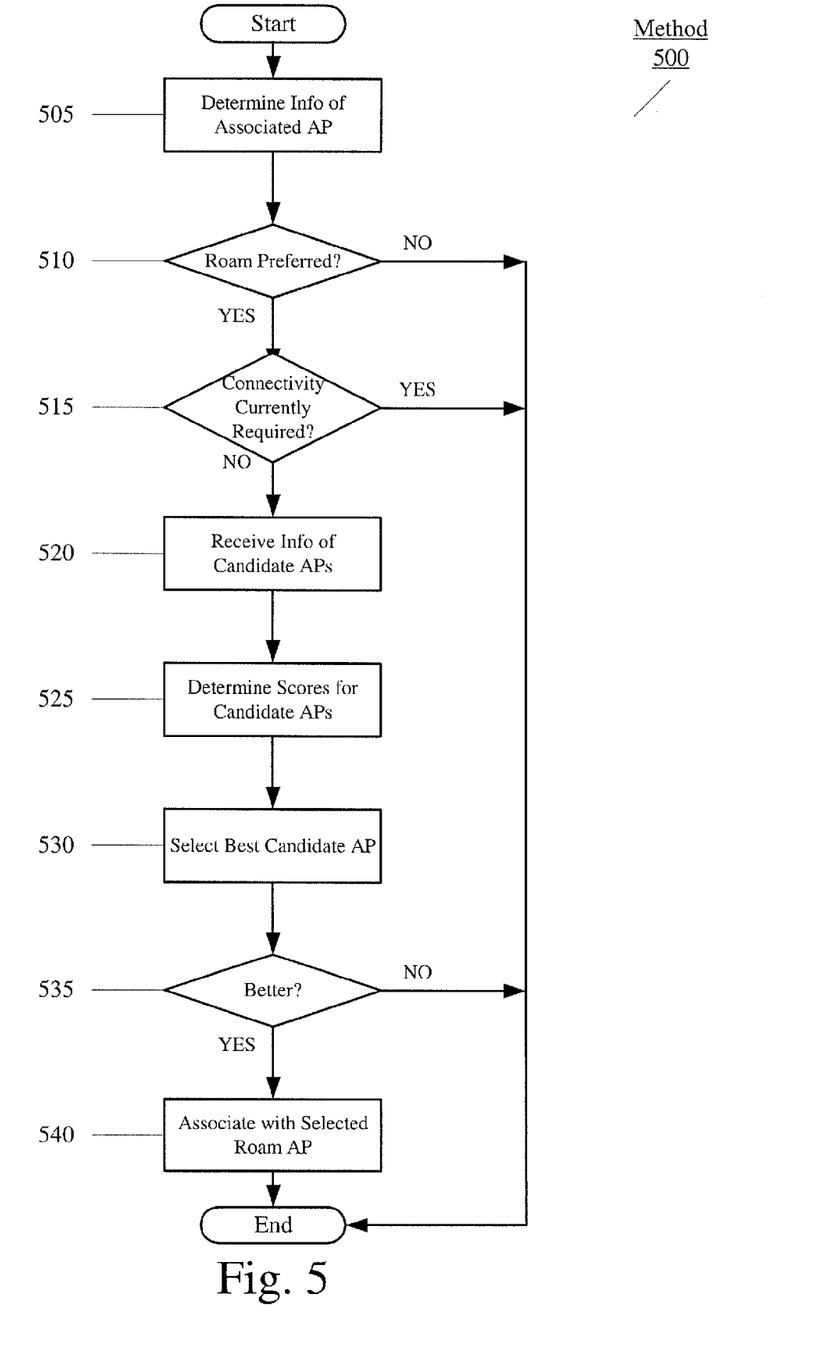
FIG. 5 shows an exemplary method for a solicited transition process of the overall process of FIG. 3.

FIG. 5 shows an exemplary method 500 for the solicited transition process in step 320 of the overall process 300 of FIG. 3. The transition application 325 may be considered to perform the solicited BSS transition management functionality. The station 105 may be considered to perform the solicited BSS transition management functionality "voluntarily" (e.g., independently of requirements of, for example, the joined network). As described above, it may be considered that the station 105 is in the roaming state and is currently joined to a network. For example, the station 105 may be associated with the AP 110 and joined to the corresponding network. The method 500 will be described with reference to the network arrangement 100 of FIG. 1 and the station 105 of FIG. 2.

In step 505, the transition application 235 determines the network related information of the associated AP. For example, the transition application 235 may request that the network related information be provided or analyze a data packet including the network related information that is provided due to the association (as may be the case in a particular standard related to the network).

In step 510, the transition application 235 determines whether a roam is preferred given the current connection to the network based upon the network related information. The transition application 235 may, for example, determine that the current connection is not sufficient. For example, the network related information may indicate that the RSSI value from the connection is particularly bad such that data exchanges take a substantially large amount of time. In another example, the network related information include the QBSS information that indicates that the AP 110 is nearly at capacity such that the available bandwidth allocated to the station 105 is too low. The value of the network related information (e.g., RSSI, QBSS, etc.) with the associated AP 110 may be compared to a predetermined threshold value that indicates the measure of quality of the connection.

If the current connection is sufficient, the method 500 ends. However, if the current connection is insufficient, the method 500 continues to step 515. In step 515, the transition application 235 determines whether a connectivity to the currently joined network is required. For example, the processor 205 may be executing an application that requires the connection to the network (e.g., a browser, a streaming application, a voice call, etc.). If the connectivity is required, the method 400 ends such that the service is not disrupted. However, if the connectivity is not required or may be paused temporarily, the method 400 continues to step 520.

In step 520, the station 105 performs a scan for available APs and receives the network related information for each of the available APs. The step 520 corresponds to the step 405 described above with reference to the method 400 of FIG. 4. For example, the station 105 may be in communication range of the APs 115, 120 such that the scan results in receiving the network related information from APs 115 and 120. It should be noted that while not specifically shown in the method of FIG. 5, the steps 410 and 415 where it is determined if any of the available APs are fully loaded (step 410) and then removing the fully loaded APs from consideration (step 415) may also be performed in the solicited transition process as shown in the method 500. In this example, it will be considered that the APs 115 and 120 are not fully loaded and remain on the candidate list.

In step 525, the transition application 235 calculates a quantitative score and/or a qualitative score for the APs 115, 120 that are on the candidate list. The transition application 235 may also calculate the quantitative and/or qualitative score for the currently associated AP 110. The quantitative score may be calculated from the RSSI value that is used to determine a rate value. The rate value may then be used to determine a product with the load value from the QBSS information. The qualitative score may be calculated from the preference rating value and the RSSI rating value that indicates a preference rating rank and a RSSI rating rank, respectively.

More specifically with reference to the quantitative score, the quantitative score may provide an objective standard in which to determine a selected AP for consideration of a roam. The quantitative score may be calculated by the transition application 235 using the network related information received from the candidate APs as well as the currently associated AP. The transition application 235 may determine a theoretical throughput associated with respective candidate APs by using the RSSI value for the AP and the load (indicated in the QBSS information) included in the network related information. The transition application 235 may calculate the theoretical throughput by first determining a rate that would be available to the station 105 for use in exchanging data based upon the RSSI value. In a first example for a currently associated AP, if the RSSI value is −65 decibels (dB), the rate may be determined to be 12 Megabits per second (Mbps). This value may be determined from a database stored in the memory arrangement 210, which correlates RSSI values to rates. The determined rate may be penalized further since there may be external parameters that influence the potential exchange rate of data, e.g., movement of the station, obstructions, etc. The penalty applied to the rate may also be stored in the database. A resulting rate may be 6 Mbps from the originally determined 12 Mbps. The QBSS information may also indicate that the AP is at 60% capacity, thereby having a 40% availability. The product of the rate (6 Mbps) and the availability (0.4) results in a theoretical throughput value of 2.4 Mbps. This may be the calculated quantitative score. In a second example for a potential candidate roam AP, the RSSI value may be −50 dB such that the resulting rate is 36 Mbps. Applying the penalty may result in 24 Mbps. If the QBSS information indicates a 50% capacity, thereby the AP has a 50% availability, the theoretical throughput may be calculated as the product resulting in 12 Mbps. A comparison between the theoretical throughput value in the first example (2.4 Mbps) and the second example (12 Mbps), the transition application 235 may determine that the network of the second example is better than the first example. In this manner, the transition application 235 may determine that a roam may be preferred if associated with the network of the first example to the network of the second example.

Figure 7A:
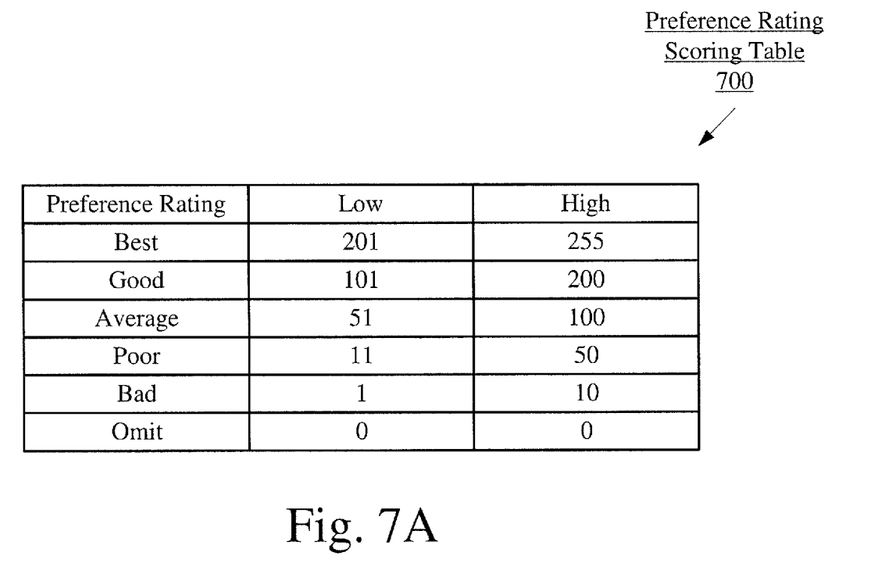
FIGS. 7A-B show exemplary scoring tables used in determining a qualitative score.

More specifically with reference to the qualitative score, the qualitative score may provide a subjective standard in which to determine a selected AP for consideration of a roam. The qualitative score may be calculated by the transition application 235 using a preference rating scoring table and a RSSI rating scoring table. FIG. 7A shows an exemplary preference rating scoring table 700 that may be used in determining the qualitative score while FIG. 7B shows an exemplary RSSI rating scoring table 750 that may be used in determining the qualitative score.

As shown in FIG. 7A, a standard may be used to determine a range of preference rating values that is "best", "good", "average", "poor", "bad", and "omit". For example and as shown in FIG. 7A, the preference rating values may be an 8-bit value ranging from 0 to 255. The range for "best" may be from 201 to 255; the range for "good" may be from 101 to 200; the range for "average" may be from 51 to 100; the range for "poor" may be from 11 to 50; the range for "bad" may be from 1 to 10; and the range for "omit" may be a value of 0. The preference rating may be a predetermined value set for each candidate AP. For example, the transition application 235 may utilize previous experiences from connections to the network as a basis for determining the preference rating scoring table. In another example, the transition application 235 may utilize the QBSS information as a basis for determining the preference rating scoring table in which a relatively low capacity AP has a higher preference rating value and a fully loaded AP has a preference rating value of 0 to omit this AP from consideration. It is noted that a candidate AP having a preference rating value of 0 may be considered as at capacity or fully loaded to omit this AP from consideration. Accordingly, the transition application 235 may generate a ranking for a candidate AP from the preference rating scoring table 700. It should be noted that the ranges of values shown in FIG. 7A are only exemplary and any range for each ranking may be used.

Figure 7B:
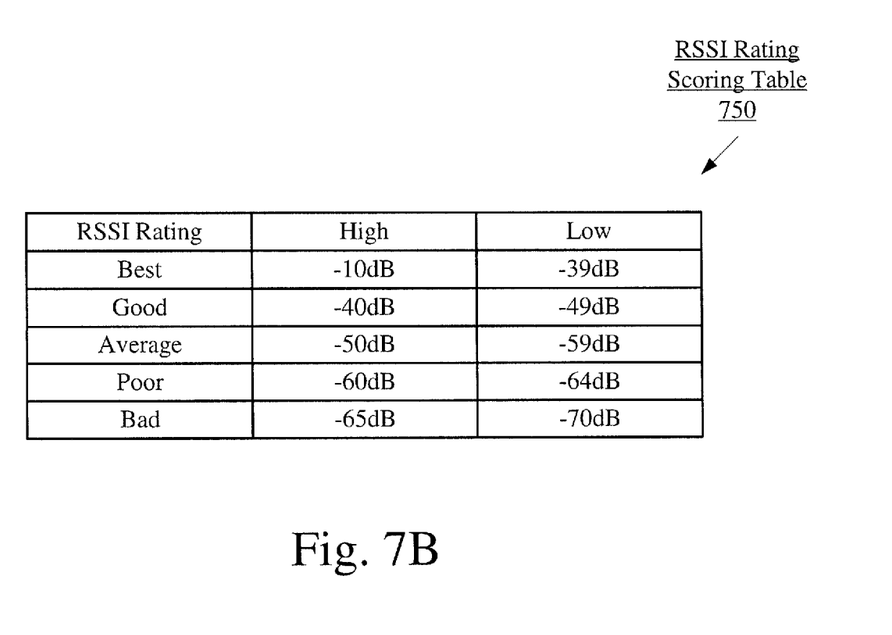

As shown in FIG. 7B, a standard may also be used to determine a range of RSSI rating values that is "best", "good", "average", "poor", "bad", and "omit". For example and as shown in FIG. 7B, the RSSI rating values may be determined from a beacon/probe response to the candidate AP. The resulting value may then be correlated to the rankings of the RSSI rating scoring table 750. The range for "best" may be from −39 dB to −10 dB; the range for "good" may be from −49 dB to −40 dB; the range for "average" may be from −59 dB to −50 dB; the range for "poor" may be from −64 dB to −60 dB; and the range for "bad" may be from −70 dB to −65 dB. For example, a RSSI value of −20 dB results in a ranking of "best" while a RSSI value of −62 dB results in a ranking of "poor." Accordingly, the transition application 235 may generate a ranking for a candidate AP from the RSSI rating scoring table 750. It should be noted that the ranges of values shown in FIG. 7B are only exemplary and any range for each ranking may be used.

The transition application 235 may utilize the ranking determined from the preference rating scoring table 700 and the RSSI rating scoring table 750 to determine whether the candidate AP is to be considered for a roam. For example, if a roam candidate has a "best" RSSI ranking and a preference rating that is "good", the transition application 235 may determine that this combination allows for the candidate AP to be considered. Such a candidate AP may be preferable over a currently associated AP which may have, for example, a "poor" RSSI ranking and a preference rating that is "average". When multiple candidate APs which are better than a currently associated AP are found from the calculated qualitative score, the transition application 235 may determine a selected optimal AP from among these candidate APs through a substantially similar analysis.

Returning to the method 500 of FIG. 5, in step 530, the transition application 235 selects a best candidate through a comparison of the calculated score (quantitative or qualitative). For example, the AP 115 may be the selected (best) roaming candidate AP. In step 535, the transition application 235 determines whether the selected AP provides a more optimal user experience than the currently associated AP 110 through a comparison of the calculated score. The comparison of the scores may be compared to a predetermined threshold value. For example, the difference of the quantitative scores of the selected AP 115 and the currently associated AP 110 may be compared to the predetermined threshold value. Thus, if the select AP 115 is better than the currently associated AP 110 and the difference in score is greater than the predetermined threshold value, in step 540, the transition application 235 determines that the roam is preferred in comparison to the current connection. This comparison of the difference in score to the predetermined value may prevent a "ping pong" effect from occurring. For example, the predetermined threshold may be a difference between the theoretical throughput values being at least 1 Mbps. Since the resulting difference of the network of the first example and the network of the second example is greater than this predetermined threshold value, the transition application 235 may determine that the roam is preferred. However, if the difference in the theoretical throughput values are less than the predetermined threshold or a negative difference results (indicating that the currently associated AP has the better theoretical throughput value), the transition application 235 may maintain the connection to the currently associated AP. Those skilled in the art will understand that an improvement determined from the difference of the theoretical throughput values that is less than the predetermined threshold may unnecessarily require a limited power supply to be used when the user experience does not result in a substantial improvement.

As discussed above, the method 500 may also include a step that omits select APs. For example, if the candidate APs provide QBSS information that indicates that at least one candidate AP is at capacity, the transition application 235 may remove these candidate APs from consideration for a roam. It should be noted that even if these candidate APs are not removed, the calculated quantitative score results in a theoretical throughput value of 0. Furthermore, the calculated qualitative score results in the preference value rating to be 0, which corresponds to an "omit" ranking.

Figure 6:
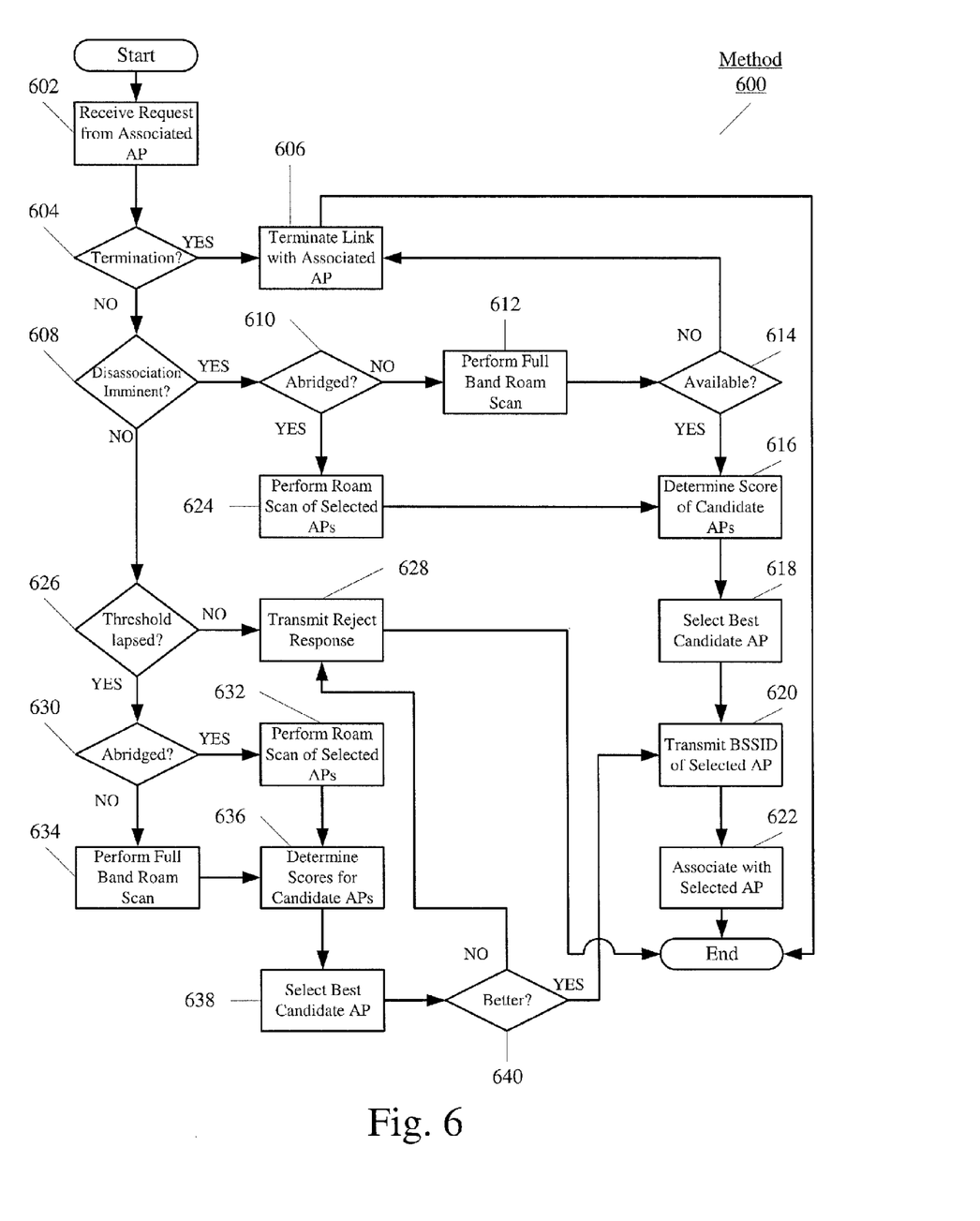
FIG. 6 shows an exemplary method for an unsolicited transition process of the overall process of FIG. 3.

FIG. 6 shows an exemplary method 600 for the unsolicited transition process in step 325 of the overall process 300 of FIG. 3. The transition application 235 may performing the unsolicited BSS transition management functionality. As described above, it may be considered that the station 105 is in the roaming state and is currently joined to a network. For example, the station 105 may be associated with the AP 110 and joined to the corresponding network. By receiving the unsolicited BS transition management request from the AP 110, the transition application 235 may be set to determine whether the roam is to be performed and to which network the station 105 is to join. FIG. 6 will be described with reference to the network arrangement 100 of FIG. 1 and the station 105 of FIG. 2.

Prior to discussing the specific steps of the method of 600, the general background of unsolicited BSS transitions will be discussed. When the station 105 is in the roaming state, the transition application 235 may receive an unsolicited BSS transition management request from the associated AP. The unsolicited BSS transition management functionality is performed in various steps dependent on the information included in the unsolicited BSS transition management request that is received from the currently connected AP.

The APs 110-120 may include a steering mechanism. The steering mechanism enables the APs 110-120 to transmit the unsolicited BSS transition management request to the station 105. The following provides several examples of information and the format of information that may be included in the unsolicited BSS transition management request. However, it should be noted that this information and the format is only exemplary and that the same type of information may be conveyed to the station 105 in a different manner.

The unsolicited BSS transition management request may include a request mode field and a payload. The request mode field may include several bits. Dependent on these bits being turned on (e.g., set to "1") or turned off (e.g., set to "0"), the payload may have corresponding information.

In a first bit (bit 0), the request mode field may include a Preferred Candidate List Included field. This field indicates whether the candidate list of APs for the station 105 included in this frame is a preferred candidate list or a list of known transition candidates. When this bit is set to "0", the station 105 may ignore the preferred candidate list. When this bit is set to "1", the associated AP 110 expects the station 105 to process this frame.

In a second bit (bit 1), the request mode field may include an Abridged field. This field indicates to the station 105 the intended treatment of all BSS identifications (BSSIDs) corresponding to the candidate APs not listed in the BSS transition candidate list in the Preferred Candidate. List Included field. Those skilled in the art will understand that the BSSID is a unique identifier of an AP. This field may be set to "1" by the associated AP 110 when a preference value of "0" is assigned to all BSSIDs that do not appear in the BSS transition candidate list. This field may also be set to "0" by the associated AP 110 when the AP 110 has no recommendation for or against any BSSID not present in the BSS transition candidate list.

In a third bit (bit 2), the request mode field may include a Disassociation Imminent field. This field indicates whether the station 105 will be disassociated from the currently associated AP 110. This field may be set to "1" by the associated AP 110 to indicate that the station 105 is to be disassociated from the associated AP 110. This field may also be set to "0" by the associated AP 110 to indicate that the disassociation is not imminent. In a substantially similar manner, the request mode field may include a BSS Termination field (e.g., "0" being the BSS not yet terminated or "1" being the BSS having been terminated) and/or an extended service set (ESS) Termination field (e.g., "0" being the ESS not yet terminated or "1" being the ESS having been terminated).

In a fourth bit (bit 3), the request mode field may include a BSS Termination Included field. This field indicates that the BSS Termination Duration field is included in which the BSS for the station 105 is shutting down and the station 105 will be disassociated. This field may be set to "1" by the associated AP 110 to indicate that the BSS is shutting down. This field may also be set to "0" by the associated AP 110 if no BSS Termination Duration information is included in the unsolicited BSS transition management request.

The request mode field may further include a Disassociation Timer field. This field indicates the time after which the associated AP 110 will issue a disassociation frame to the station 105. This field is set to the number of beacon transmission times (TBTTs) until the associated AP 110 sends a disassociation frame to the station 105. This field may be set to "0" to indicate that the associated AP 110 has not determined when it will send a disassociation frame to the station 105. If the Disassociation Imminent field is set to 0, the Disassociation Timer field is reserved.

Using the information included in the request mode field of the unsolicited BSS transition management request received from the associated AP 110 by the station 105, the transition application 235 may perform the unsolicited BSS transition management functionality accordingly.

Returning to the method 600 of FIG. 6, the specific exemplary steps of performing unsolicited BSS transition management functionality will be described. In step 602, the transition application 235 receives the unsolicited BSS transition management request from the associated AP 110. For example, the AP 110 may be at capacity and requires at least one of the associated stations to be removed from the BSS. Upon receiving the unsolicited BSS transition management request, the transition application 235 may analyze the bits that are set in the request mode fields to determine the manner in which to process the unsolicited BSS transition management request.

In step 604, the transition application 235 determines whether the BSS Termination field and/or the ESS Termination field has been set (e.g., to a value of "1"). As discussed above, when these fields are set, this may indicate that the station 105 has been removed from the BSS and/or the ESS of the associated AP 110. If set, the method 600 continues to step 606. In step 606, the transition application 235 terminates the link with the associated AP 110. Subsequently, the station 105 reverts to the pre-association state such that the method 400 of FIG. 4 may be performed. As part of this process, the transition application 235 may assign a preference value of "0" to the AP 110 such that the AP 110 may be removed from consideration by constructively determining the AP 110 is at full capacity.

If the BSS Termination field and/or the ESS Termination field is not set (e.g., to a value of "0"), the method 600 continues from step 604 to step 608. In step 608, the transition application 235 determines whether the Disassociation Imminent field has been set (e.g., to a value of "1"). As discussed above, when this field is set, this may indicate that the station 105 is going to be removed from the BSS of the associated AP 110 within a relatively short, predetermined amount of time (which may be indicated in the Disassociation Timer field of the request mode field of the unsolicited BSS transition management request).

Also as discussed above, when the Disassociation Imminent field is set, the Abridged field may also be set. This field indicates to the station 105 the intended treatment of all BSS identifications (BSSIDs) corresponding to the candidate APs not listed in the BSS transition candidate list in the Preferred Candidate List Included field. Thus, in step 610, the transition application 235 determines whether the Abridged field is also set.

If the Disassociation Imminent field is set but the Abridged field is not set, the method 600 continues from step 610 to step 612. In step 612, the station 105 performs a full band roam scan to determine whether any AP is within communication range of the station 105. In step 614, the transition application 235 determines whether the scan detected any available APs. If no APs are available (e.g., the scan of step 612 did not detect any APs), the method 600 may continue to step 606 where the link is terminated with the associated AP 110 as the disassociation is imminent. Again, the station 105 may revert to the pre-association state with the AP 110 removed from consideration. It should be noted that the transition application 235 may remove any candidate AP that is at capacity from consideration. Thus, this determination may also contribute to the determination of step 614.

If there are APs are available as determined by the full band roam scan, the method 600 continues from step 614 to step 616. The scan detection may include may include the network related information for each available AP. In step 616, the transition application 235 calculates the quantitative and/or qualitative scores of the candidate APs. Example manners of determining the quantitative and/or qualitative scores of the candidate APs has been described above with reference to step 525 of method 500. Since the Disassociation Imminent field has been set, the transition application 235 may assume that the roam must be performed for the connectivity to continue for the user. Therefore, the score may not be calculated for the associated AP 110.

In step 618, the transition application 235 determines a select (best) roaming candidate AP through a comparison of the calculated scores. Again, this step 618 was fully described above with reference to step 530 of the method 500. In step 620, as the roam is to be performed, the transition application 235 transmits the BSSID of the selected AP to the associated AP 110 to indicate that the station 105 is to join the BSS of the selected AP in response to receiving the unsolicited BSS transition management request. Thus, in step 622, the transition application 235 performs the association process to associate with the selected AP and join the corresponding network.

Returning to step 610, when the Disassociation Imminent field and the Abridged field are set, the method 600 continues to step 624. In step 624, the station 105 performs a roam scan of the candidate APs of the preferred candidate list included in the unsolicited BSS transition management request. The transition application 235 may assume that the preferred candidate list include APs that the station 105 is in communication range. Thus, the roam scan of these APs may provide the network related information for each. Subsequently, the transition application 235 may perform the steps 616-622 as described above.

Returning to step 608, if the BSS Termination field, the ESS Termination field, and the Disassociation Imminent field are not set, the method 600 continues to step 626. In step 626, the transition application 235 may determine whether a throttling threshold has lapsed. Upon receiving the unsolicited BSS transition management request from the associated AP 110 in step 602, the transition application 235 may initiate a throttling timer (e.g., 600 seconds). If the throttling threshold has not lapsed, the method 600 may continue to step 628. Since the BSS Termination field, the ESS Termination field, and the Disassociation Imminent field are not set, the station 105 may still have a relatively large amount of time to maintain its connectivity to the associated AP 110. Therefore, when the throttling threshold has not lapsed, in step 628, the transition application 235 may transmit a reject response to the associated AP 110 for the unsolicited BSS transition management request that was received. That is, the station 105 is declining the request from the AP to disassociate and associate with a different AP.

Returning to step 626, if the BSS Termination field, the ESS Termination field, and the Disassociation Imminent field are not set as well as the throttling threshold lapsing, the method 600 continues to step 630. In step 630, the transition application 235 determines whether the Abridged field has been set. If the Abridged field has been set (e.g., set to a value of "1"), the method 600 continues to step 632 where a roam scan of the selected APs as indicated in the preferred candidate list is performed. If the Abridged field has not been set (e.g., set to a value of "0"), the method 600 continues to step 634 where a full band roam scan is performed. Subsequent to steps 632 and 634, the method 600 continues to step 636 where the transition application 235 determines a candidate list of APs (e.g., removes APs that are at capacity) and calculates scores for each of these APs. When the Abridged field is set, the candidate list of APs include the APs indicated in the preferred candidate list while when the Abridged field is not set, the candidate list of APs include the APs that provide a response to the beacon/probe query. In step 638, the transition application 235 determines the best candidate AP from the candidate list.

Since the Termination fields and the Disassociation Imminent field are not set but the throttling threshold has lapsed, a roam may be determined to be preferable. However, this is determined based upon a comparison to the current connection to the network corresponding to the currently associated AP 110. Therefore, the transition application 235 may also calculate the score for the currently associated AP 110. In step 640, the transition application 235 determines whether the select (best) candidate AP is better than the currently associated AP through a comparison of the scores. That is, this determination relates to which network will theoretically provide a better user experience.

If the currently associated AP 110 has a better score than the selected candidate AP, the method 600 continues to step 628 in which the reject response is transmitted to the associated AP 110 in response to the unsolicited BSS transition management request. That is, the associated AP 110 still provides the best service to the user. However, if the associated AP 110 has a lower score than the selected candidate AP, the method 600 continues from step 640 to step 620 such that a roam is performed.

As described above, the transition application 235 may be able to perform fine adjustments of the calculated scores. For example, a "ping pong" effect may occur when a station associated with the AP 110 receives an unsolicited BSS transition management request with the Dissociation Imminent field set (e.g., to a value of "1") and subsequently roams to the AP 115. However, if the network corresponding to the AP 115 has a "bad" RSSI value, the transition application 235 may return to the network corresponding to the AP 110. This may subsequently repeat which drains the power supply of the station 105 as well as causing intermittent service that disrupts an expected continuous service for the user experience. As discussed above, the transition application 235 may set the preference rating value to 0 for APs that have transmitted the unsolicited BSS transition management request, particularly when the Disassociation Imminent field has been set.

Using the above exemplary method 600 for responding to the unsolicited BSS transition management request, the transition application 235 may dynamically determine whether a roam is to be performed and to which AP a roam is to be performed based upon the bits that are set in the request mode fields of the unsolicited BSS transition management request. Again, the unsolicited BSS transition management request is not required to have the fields and bits set as described above, as there may be other manners of conveying the information that has been described herein.

The exemplary embodiments provide a system and method for a BSS transition management of a station. The station may include a transition application that determines whether the station is in a pre-association state in which the station is not currently joined to a network or a roaming state in which the station is currently joined to a network. When in the pre-association state, the transition application may determine a select AP among candidate APs within communication range of the station. The transition application may omit APs that are at capacity or fully loaded from the candidate APs. When in the roaming state, the transition application may determine whether a solicited BSS transition management functionality or an unsolicited BSS transition management functionality is to be performed. When the solicited BSS transition management functionality is performed, the station determines that a set of conditions of the station and the currently associated AP is sub-optimal such that a roam may be preferred. Through calculating a score for candidate APs, the transition application may determine whether the currently associated AP is preferred or whether a roam to a candidate AP is preferred based upon the calculated score. When the unsolicited BSS transition management functionality is performed, the station receives an unsolicited BSS transition management request from the associated AP. Based upon bits that are set in the request mode fields of the unsolicited BSS transition management request, the transition application may determine whether a roam is to be performed and to which AP the roam is to be performed. Specifically, the calculated score may also be used in select cases dependent on the bits that are set.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile hardware device operating iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
    at a station:
        determining whether a roam is to be performed, the station being associated with a first access point (AP) corresponding to a first network, wherein the determining whether the roam is to be performed is based at least in part upon an unsolicited transition, wherein;
        the unsolicited transition includes receiving an unsolicited request by the station from the first AP; and
        the unsolicited request includes at least one of (i) an indication that the station has been removed from one of the basic service set (BSS) or the extended service set (ESS) of the first AP or (ii) an indication of a time remaining before the station will be removed from one of the basic service set (BSS) or the extended service set (ESS) of the first AP;
        receiving network information for at least one second AP within a communication range of the station;
        determining a full AP of the at least one second AP, wherein the full AP has a load value indicating a full capacity;
        determining a score value for each of the at least one second AP corresponding to a respective second network based upon the respective network information and excluding the full AP such that the score value is not determined and the full AP is not eligible for the roaming, the score value being one of a quantitative score, the quantitative score being calculated as a function of a respective received signal strength indicator (RSSI) value and a respective load value, or a qualitative score, the qualitative score being calculated as a function of a preference value and the RSSI value;
        selecting one of the at least one second AP based upon the respective score value; and
        roaming from the first AP to the selected one of the at least one second AP.

2. The method of claim 1, wherein the qualitative value is calculated by:
    determining a first ranking value based upon the preference value;
    determining a second ranking value based upon the RSSI value; and
    determining the qualitative value using the first and second ranking values.

3. The method of claim 1, wherein the determining whether a roam is to be performed is further based upon a solicited transition, the solicited transition including a determination of a connectivity quality with the first AP.

4. The method of claim 3, further comprising:
    determining a score value for the first AP;
    comparing the score value of the first AP with the score value of the selected second AP; and
    determining, based on the comparing, that the selected second AP provides an improved connectivity quality over the first AP.

5. The method of claim 1, wherein the unsolicited request includes information provided by the first AP to the station to perform the unsolicited transition.

6. The method of claim 5, wherein, the information includes a predetermined candidate list of APs including the at least one second AP.

7. The method of claim 5, wherein, when the information does not include a predetermined candidate list of APs, the method further comprises:
    performing a full band roam scan to identify the respective network information for each of the at least one second AP.

8. The method of claim 1, wherein the quantitative value is calculated by:
    converting the RSSI value into a first data rate value;
    determining a second data rate value based upon the first data rate value and a penalty index, indicative of external parameters that affect the first data rate value; and
    determining the quantitative value as an estimated throughput value using a product of the second data rate value and the load value.

9. A station being associated with a first access point (AP) corresponding to a first network, comprising:
    a transceiver configured to establish a connection with the first AP; and
    a processor;

wherein the processor and transceiver are configured to perform a roam handover from the first AP to one of at least one second AP corresponding to a respective second network by:
- determining whether a roam is to be performed, wherein the determining whether a roam is to be performed is based at least in part upon an unsolicited transition, wherein;
  - the unsolicited transition includes receiving an unsolicited request by the station from the first AP; and
  - the unsolicited request includes at least one of (i) an indication that the station has been removed from one of the basic service set (BSS) or the extended service set (ESS) of the first AP or (ii) an indication of a time remaining before the station will be removed from one of the basic service set (BSS) or the extended service set (ESS) of the first AP;
- receiving network information for the at least one second AP within a communication range of the station;
- determining a full AP of the at least one second AP, wherein the full AP has a load value indicating a full capacity;
- determining a score value for each of the at least one second AP based upon the respective network information and excluding the full AP such that the score value is not determined and the full AP is not eligible for the roaming, the score value being one of a quantitative score or a qualitative score;
- selecting one of the at least one second AP based upon the respective score value; and
- roaming from the first AP to the selected one of the at least one second AP.

10. The station of claim 9, wherein the qualitative value is determined by:
- determining a first ranking value based upon a preference value;
- determining a second ranking value based upon an RSSI value; and
- determining the qualitative value using the first and second ranking values.

11. The station of claim 9, wherein the determining whether a roam is to be performed is further based upon a solicited transition, the solicited transition including a determination of a connectivity quality with the first AP.

12. The station of claim 11, wherein, the solicited transition, causes the processor to perform the roam handover by:
- determining a score value for the first AP;
- comparing the score value of the first AP with the score value of the selected second AP; and
- determining, based on the comparing, that the selected second AP provides an improved connectivity quality over the first AP.

13. The station of claim 12, wherein the solicited transition, causes the processor to perform the roam handover by:
- comparing the difference value to a predetermined threshold value, wherein, the difference value exceeding the predetermined threshold indicates the selected second AP provides an improved connectivity quality over the first AP.

14. The station of claim 9, wherein the unsolicited request includes information provided by the first AP to the station to perform the unsolicited transition.

15. The station of claim 14, wherein the information includes a predetermined candidate list of APs including the at least one second AP.

16. The station of claim 14, wherein, when the information does not include a predetermined candidate list of APs, the processor is further configured to:
- perform a full band roam scan to identify the respective network information for each of the at least one second AP.

17. The station of claim 9, wherein the quantitative value is calculated by:
- converting an RSSI value into a first data rate value;
- determining a second data rate value based upon the first data rate value and a penalty index, the penalty index being indicative of external parameters that affect the first data rate value; and
- determining the quantitative value as an estimated throughput value from finding a product of the second data rate value and a load value.

18. A non-transitory computer readable storage medium with an executable program stored thereon, wherein the program instructs a microprocessor to perform operations comprising:
- determining whether a roam is to be performed, the station being associated with a first access point (AP) corresponding to a first network, wherein the determining whether a roam is to be performed is based at least in part upon an unsolicited transition, wherein;
  - the unsolicited transition includes receiving an unsolicited request by the station from the first AP; and
  - the unsolicited request includes at least one of (i) an indication that the station has been removed from one of the basic service set (BSS) or the extended service set (ESS) of the first AP or (ii) an indication of a time remaining before the station will be removed from one of the basic service set (BSS) or the extended service set (ESS) of the first AP;
- receiving network information for at least one second AP within a communication range of the station;
- determining a full AP of the at least one second AP, wherein the full AP has a load value indicating a full capacity;
- determining a score value for each of the at least one second AP corresponding to a respective second network based upon the respective network information and excluding the full AP such that the score value is not determined and the full AP is not eligible for the roaming, the score value being one of a quantitative score, the quantitative score being calculated as a function of a respective received signal strength indicator (RSSI) value and a respective load value, or a qualitative score, the qualitative score being calculated for each of the at least one second AP as a function of a preference value and the RSSI value;
- selecting one of the at least one second AP based upon the respective score values; and
- roaming from the first AP to the selected one of the at least one second AP.

* * * * *